United States Patent [19]

Smith

[11] E Patent Number: Re. 32,891

[45] Reissued Date of Patent: Mar. 21, 1989

[54] POURING SPOUT OPENING CONFIGURATION FOR A GABLE TOP OF A CONTAINER

[75] Inventor: Wesley H. Smith, Rochester, Mich.

[73] Assignee: International Paper Company, Purchase, N.Y.

[21] Appl. No.: 876,320

[22] Filed: Jun. 19, 1986

Related U.S. Patent Documents

Reissue of:

[64] Patent No.: 4,527,732
Issued: Jul. 9, 1985
Appl. No.: 608,771
Filed: May 10, 1984

[51] Int. Cl.[4] ..... B65D 5/72

[52] U.S. Cl. ..... 229/179; 206/629; 206/631

[58] Field of Search ..... 229/179; 206/264, 629, 206/484, 631

[56] References Cited

U.S. PATENT DOCUMENTS

| | | | |
|---|---|---|---|
| 2,178,091 | 4/1965 | Tobias et al. | 229/17 |
| 2,475,677 | 7/1949 | Ringler | 229/17 |
| 2,978,846 | 4/1961 | Struble | 229/17 |
| 3,167,231 | 1/1965 | Bray | 229/17 |
| 3,178,089 | 4/1965 | Tobias et al. | 229/17 |
| 3,186,621 | 6/1965 | Svensson | 229/17 |
| 3,245,603 | 4/1966 | Wilcox | 229/17 |
| 3,295,739 | 1/1967 | Wilcox | 229/17 |
| 3,297,227 | 1/1967 | Wallsten | 229/17 |
| 3,331,319 | 7/1967 | Martensson | 101/291 |
| 3,333,758 | 8/1967 | Buchner | 229/17 |
| 3,341,104 | 9/1967 | Loheed et al. | 229/37 |
| 3,347,444 | 10/1967 | Rausing et al. | 229/17 |
| 3,348,755 | 10/1967 | MacEwen | 229/17 |
| 3,355,083 | 11/1967 | Wilcox | 229/17 |
| 3,437,257 | 4/1969 | Bua | 229/51 |
| 3,450,328 | 6/1969 | Barrett | 229/17 |
| 3,452,919 | 7/1969 | Avolio | 229/17 |
| 3,537,634 | 11/1970 | Collie | 229/17 |
| 3,543,993 | 12/1970 | Rausing | 229/17 |
| 3,554,430 | 1/1971 | MacEwen | 229/17 |
| 3,561,665 | 2/1971 | Smith | 229/17 |
| 3,570,744 | 3/1971 | Smith | 229/17 |
| 3,981,433 | 9/1976 | Thornhill et al. | 229/51 |
| 4,293,068 | 10/1981 | Focke et al. | 206/264 |
| 4,351,433 | 9/1982 | Barber et al. | 206/264 |
| 4,375,260 | 3/1983 | Focke et al. | 206/264 |
| 4,390,121 | 6/1983 | Lisiecki | 229/17 G |
| 4,410,128 | 10/1983 | Rausing | 229/17 R |

FOREIGN PATENT DOCUMENTS

| | | |
|---|---|---|
| 864013 | 6/1978 | Belgium . |
| 88730A | 9/1983 | European Pat. Off. . |
| 857625 | 10/1952 | Fed. Rep. of Germany . |
| 1264317 | 9/1968 | Fed. Rep. of Germany . |
| 1486438 | 7/1969 | Fed. Rep. of Germany . |
| 2520569 | 11/1975 | Fed. Rep. of Germany . |
| 2623176 | 12/1977 | Fed. Rep. of Germany . |

*Primary Examiner*—Joseph Man-Fu Moy
*Attorney, Agent, or Firm*—Wayne M. Kennard

[57] ABSTRACT

The present invention is an improved pouring spout opening configuration for a gable top (1) of an extended shelf life packaging container constructed of heat and pressure sealed thermoplastic coated paperboard with the pouring spout shape being defined by a continuous non-linear perforated line (20) placed in the underlying paperboard support layer of the laminate structure used for extended shelf life packaging containers.

6 Claims, 3 Drawing Sheets

POURING SPOUT OPENING CONFIGURATION FOR A GABLE TOP OF A CONTAINER

Matter enclosed in heavy brackets [ ] appears in the original patent but forms no part of this reissue specification; matter printed in italics indicates the additions made by reissue.

DESCRIPTION

TECHNICAL FIELD

The present invention relates to an improved pouring spout opening configuration for an extended shelf life of a tubular container constructed from a laminated structure used for extended shelf life packaging. In particular, the present invention relates to an improved configuration for a pour spout opening for a gable top allowing for greater seal integrity for extended shelf life of packages, while insuring ease in opending and extending the pouring spout of the gable top.

BACKGROUND ART

There have been considerable problems associated with opening extended shelf life packaging containers configured with a gable top. Extended shelf life packaging containers are containers which give perishable food products, such as juices or milk, a longer shelf life, up to periods of 6 months in some cases. The laminated structure used for construction of extended shelf life packaging, generally has a main structural support member made of a cardboard or paperboard. Disposed on the side of the paperboard, which will ultimately be the outside of the constructed container, is one or a plurality of thermoplastic layers constructed of low density polyethylene or high density polyethylene or combinations thereof. Disposed on the side of the paperboard, which will ultimately be the inside of the constructed extended shelf life packaging container, are a foil barrier and a plurality of thermoplastic layers, again being constructed of material such as low density polyethylene or high density polyethylene or combinations thereof.

One of the significant problems to be solved in the use extended shelf life packaging was to provide a high integrity seal for the container while also maintaining ease in opening the container. Conventional sealing of extended shelf life packaging utilized various placements of abhesive coating material in the area of the gable top enclosing the pouring spout. Without such use of abhesive coating applications on the gable top, there was great difficulty in opening the gable top of the container, since, as stated, high integrity sealing is a must in extended shelf life packaging, often tearing or ripping of the pouring spout resulted. The use of abhesive coating for traditional foil lined containers was set forth in an U.S. Pat. No. 3,334,799. The improvements to such dispositions of abhesive coating are found in patent application Ser. No. 596,517 of Catarella et al. assigned to International Paper Company.

Even though there is placement of abhesive coating on the containers to facilitate extending pouring spout, there remains the problem that the seal containing the abhesive coating material is not as strong as a seal not requiring the use of any abhesive coating.

In the past, there has not been any specific attempts to construct a gable top for an extended shelf life packaging container, which has a high integrity at the laminer rib seal which does not house portions of the pouring spout within the seal. As previously stated, extended shelf life packaging to date has utilized the positioning of abhesive coating material in the seal area of the container to allow ease in opening the container. In the past there have been various attempts to provide different methods for opening gable tops which do not utilize portions of the laminar rib to define part of the pour spout opening. However, these gable top structures were not constructed of a laminated structure such as is used in extended shelf life packaging containers. Therefore, such configurations would not be particularly useful for present day extended shelf life packaging containers for defining the pouring spout area.

In the past, gable top structures of conventional thermoplastic coated paperboard utilized weakened lines of severance of slits through the thicknesses of the structure material to attempt to facilitate the opening of a pour spout without worry of providing adhesive coating to the laminated rib disposed at the top of the gable top. In order to insure that there was not a leakage problem and to facilitate opening the package, in some cases, a strip of tape was heat sealed to the line of severance or slit on the outside surface to facilitate opening the container. It was also important that no score lines extend to the weakened line of severance, since it created leakage problems due to the capillary action of the fluid in the container in the score line to the weakened line of severance, thereby causing leakage of the fluid into the structure itself. When it was desired to open these packages having weakened lines of severance covered by tape, the tape was pulled away, thus removing the immediate layer of thermoplastic and a portion of the fibrous paperboard material from the panel. This provided a weakened area adjacent to the weakened line of severance to facilitate opening the container. Patents disclosing the use of tape on conventional thermoplastic coated paperboard containers are U.S. Pat. Nos. 3,570,744; 3,561,665; 3,554,430; 3,537,634; 3,452,919; 3,450,328; 3,355,083; 3,348,755; 3,295,739; and 3,186,621. Patents disclosing the use of weakened lines of severance that are sealed within the laminar rib of the gable top of the conventional containers are U.S. Pat. Nos. 3,543,993; 3,245,603; 3,178,091; 3,178,089; and 3,167,231. A patent which discloses the use of flap, which is folded over and heat sealed within the laminar rib for covering a weakened line of severance in a portion of the laminar rib is U.S. Pat. No. 4,390,121.

The present invention overcomes these problems by providing a pouring spout opening configuration utilizing weakened lines of severance for extended shelf life packaging containers, which is superior to conventional configurations.

DISCLOSURE OF INVENTION

The present invention is an improved pouring spout opening configuration for a gable top of a tubular container for extended shelf life packaging containers constructed of an extruded laminate structure used for extended shelf life packaging.

The representative cross-sectional construction of extended shelf life packaging material, used for construction of extended shelf life containers, consists of an outer layer of low density polyethylene, a layer of paperboard, a layer of thermoplastic, a layer of aluminum foil, a second layer of thermoplastic, a second layer of low density polyethylene, followed by a third layer of low density polyethylene as an inside layer. Although the laminated structure above discloses a representative construction of extended shelf life material, it is contemplated by the inventor that extended shelf life packaging material includes all laminated structures which are used for the construction of extended shelf life packaging containers.

The gable top of the present invention is one of standard construction known in the art. The laminar rib of the gable top of the present invention forms a high integrity seal and contains no adhesive coating material to aid in opening the pour spout. The pour spout shape is defined by a continuous non-linear perforated line (line of severance) through the paperboard layer of the laminate structure. The continuous non-linear perforated line extends across a first fold-back panel, across the triangular fold-in panel adjacent to the first fold-back panel, and across a second fold-back panel adjacent to a second side of the triangular fold end panel. The continuous non-linear perforated line does not extend into any of the panels which make up the upstanding laminar rib, namely the end rib panels which surmount the respective fold-back panels, which is heat and pressure sealed. The continuous non-linear perforated line in the paperboard is placed in the paperboard in the appropriate place prior to extruding the laminate structure used for construction of the extended shelf life container.

After the gable top container is constructed of the extended shelf life laminate material, the layers of thermoplastic foil and polyethylene overlying both sides of the continuous non-linear perforated line extending across the stated fold-back panels and the first triangular fold-in panel, give the structure adjacent to the perforated line strength and rigidity. Also, the placement of the perforated line prevents easy access to the perforated line, since the perforated line is folded under the gable top in its assembled condition.

When it is desired to open the gable top and extend the pour spout, the movable portion of the gable top is opened by bending back the respective fold-back panels, breaking the laminar rib seal and exposing the area of the panels of the gable top containing the continuous non-linear perforated line. Once in this position, a portion of the first triangular fold-in panel, above the perforated line, is pressed inwardly toward the interior of the container, thus severing all of the thicknesses of the laminated structure at least along part of the perforated line across the triangular fold-in panel. After the initial severance of the portion of the line is accomplished, the fold-back panels adjacent to respective sides of triangular fold-in panel are pushed rearward of their position so that the fold-back panels form a reflex angle. Once this position has been assumed the fold-back panels are moved in a forward direction such that the respective sides of the fold-back panels adjacent to the respective roof panels pass no closer to a vertical plane passing through the upstanding laminar rib than the distance the sides were from such vertical plane when a reflex angle was first formed between the fold-back panels. In the forward movement of the fold-back panels, the laminate structure will be caused to sever along the continuous non-linear perforated line. As the continuous non-linear perforated line is being progressively severed in the forward movement of the panels, the pouring spout is formed from the remainder of the fold-back panels and the triangular fold-in panel which were below the continuous non-linear perforated line across those panels. The portion of the panels which were above the continuous non-linear perforated line remain connected to the end rib panels which surmounted the fold-back panels. These connected portions are folds under along the roof panels when the pouring spout fully is extended.

The object of the invention is to provide a novel pouring spout opening configuration for use in extended life packaging containers which utilizes a continuous perforated line in the underlying paperboard support structure to define the pouring spout and allow easy opening and extension of a pouring spout without the worry of the loss of seal integrity by the use of adhesive coating material in the top laminar sealing rib.

Another object of the invention is to provide a method of opening a pour spout area for an extended shelf life gable top container.

These and other objects will be described more fully in the remaining portions of the disclosure.

BEST MODE FOR CARRYING OUT THE INVENTION

Figure 1:
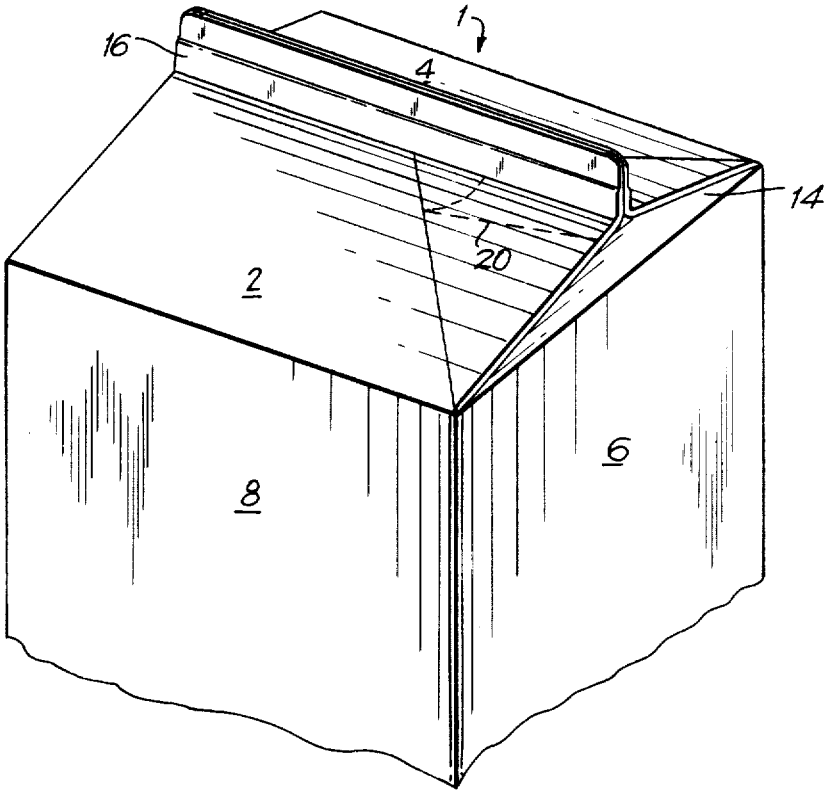
FIG. 1 shows a gable top of an extended shelf life packaging container with portions of the continuous non-linear perforated line defining the pour spout shown in phantom.

FIG. 1 is generally at 1, shows an assembled gable top of an extended shelf life container. In the description, unless otherwise indicated, when a specific panel of the container is referred to as being integral with another panel, it is intended to mean that the panels are disposed adjacent to one another separated by a fold line or score line.

Figure 2:
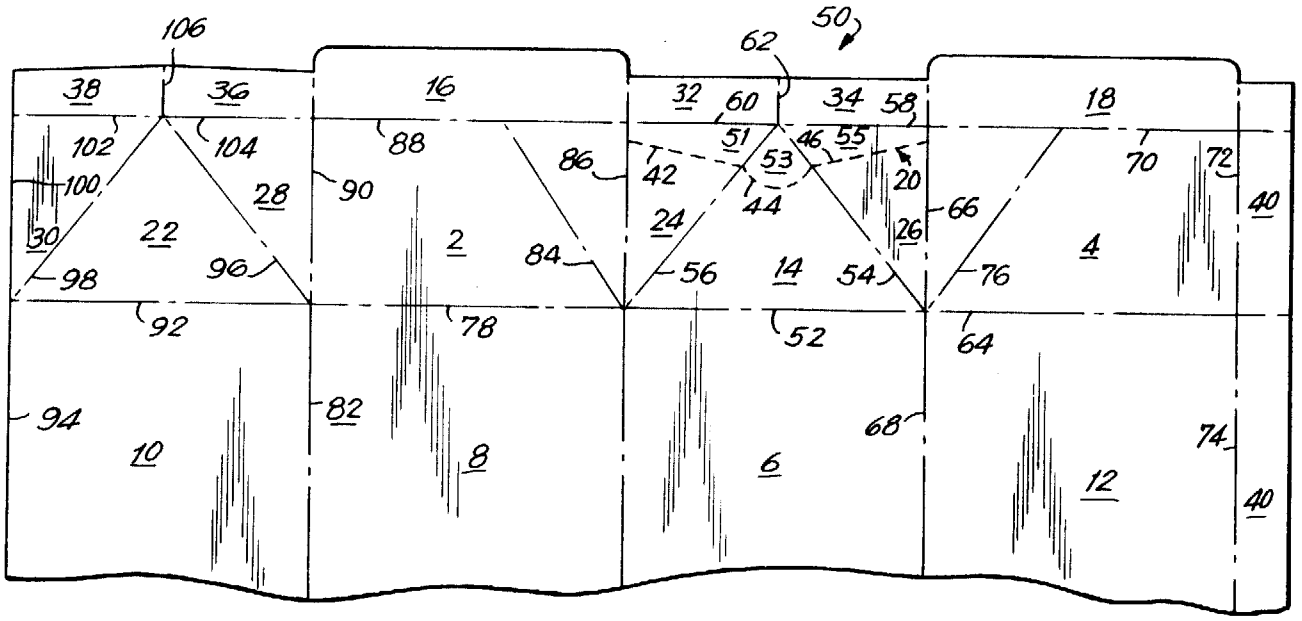
FIG. 2 shows an unassembled coated paperboard blank for an extended shelf life packaging container further showing the position of the continuous non-linear perforated line disposed in the underlying paperboard support member of the extended shelf life lamination material.

Referring to FIG. 1, the gable top as shown, has roof panels 2 and 4 which are inclined toward each other. Roof panels 2 and 4 are integral with sides 8 and 12 (FIG. 2), respectively. The gable top has two triangular fold-in panels 14 and 22 (FIG. 2), which are integral with front panel 6, and back panel 12 (FIG. 2), respectively. The fold-in panels are disposed on opposite sides of the gable top. Integral with the roof panel 2 is side rib panel 16 and integral with roof panel 4 is side rib panel 18 (FIG. 2). The side rib panels surmount the respective roof panels. Also shown in FIG. 1 in phantom, is a portion of the continuous non-linear perforated line which is used to define the extendable pour spout of the gable top of the extended shelf life container.

Referring to FIG. 2, the exterior surface of an unassembled extended shelf life container blank is generally shown at 50. The panel sections of the gable top of the container and their relationship are described in the following text. Front panel 6 is integral with triangular fold-in panel 14 at fold line 52. Integral with triangular fold-in panel 14 at fold lines 56 and 54, respectively, are fold-back panels 24 and 26. Surmounting respective fold-back panels 24 and 26 are end rib panels 32 and 34, respectively. End rib panel 32 is integral with foldback panel 24 at fold line 60; and end rib panels 34 is integral with fold-back panel 26 and 58. The end rib panels 32 and 34 are integral at vertical fold line 62.

The continuous non-linear perforated line for defining the pour spout area of the gable top extends across portions of fold-back panel 24, triangular fold-in panel 14 and fold-back panel 26. The perforations are in the underlying paperboard support layer which is overlaid with thermoplastic and foil layers, as previously described, which maintain the rigidity of the panel sections containing the perforated line. The continuous non-linear perforated line has three segments. First segment 42 of continuous non-linear perforated line 20 in fold-back panel 24 which is downwardly sloping across fold-back panel 24. Second segment 44 of continuous perforated non-linear line 20 is a downwardly disposed circular segment extending from a fold line 56 to fold line 54. Third segment 46 of continuous non-linear perforated line 20 which crosses fold-back panel 26 is upwardly slopping from fold line 54.

Now we describe the remainder of the panels which make up the gable top of the extended shelf life container. Side panel 8 of the container is integral with a front panel 6 at fold line 80. Integral with side panel 8 is roof panel 2. Roof panel 2 is integral with side panel 8 at fold line 78. Fold line 84, which extends across the roof panel 2, is to assist in opening the container pour spout when it is desired to extend it from the container. Roof panel 2 is integral with fold-back panel 24 at fold line 86. Surmounting roof panel 2 is side rib panel 16. Side rib panel 16 is integral with roof panel 2 at fold line 88.

Integral with side panel 8 is back panel 10. Back panel 10 is integral with side panel 8 at fold line 82. Integral with back panel 10 is the second fold-in panel 22. Fold-in panel 22 is integral with back panel 10 at fold line 92. Integral with triangular fold-in panel 22 is fold-back panel 28. Fold-back panel 28 is integral with triangular fold-in panel 22 at fold line 96. Integral with triangular fold-in panel 22 on a different side is fold-back panel 30. Fold-back panel 30 is integral with triangular fold-in panel 22 at fold line 98. Surmounting fold-back panels 28 and 30 are the second and third end rib panels 36 and 38, respectively. Surmounting fold-back panel 28 is end rib panel 36, which is integral with fold-back panel 28 at fold line 104. Surmounting fold-back panel 30 is end rib panel 38, which is integral with fold-back panel 30 at fold line 102. Each rib panels 36 and 38 are integral at vertical fold line 106.

Also integral with front panel 6 is side panel 12. Side panel 12 is integral with front panel 6 at fold line 68. Integral with side panel 12 is the second roof panel 4, which is integral with side panel 12 at fold line 64. Extending across roof panel 4 is fold line 76 which is used to assist in extending the pouring spout when desired to do so. Integral with roof panel 4 is a fold-back panel 26. Fold-back panel 26 is integral with roof panel 4 at fold line 66. Surmounting roof panel 4 is a side rib panel 18. Side rib panel 18 is integral with roof panel 2 at fold line 70. Panel 40, which is integral with roof panel 4 at fold line 72 and side panel 12 at fold line 74, is heat sealed to the interior surface of side panels 10, fold-back panel 30 and end rib panel 38 along edges 94 and 100 for forming the container.

When the gable top of the container is in its assembled and sealed condition, fold-in panel 14, fold-back panel 24, fold-back panel 26, end rib panel 32 and 34 form the movable portion of the gable top; while fold-in panel 22, fold-back panel 28, fold-back panel 30 and end rib panels 36 and 38 form the fixed portions of the gable top.

Figure 3:
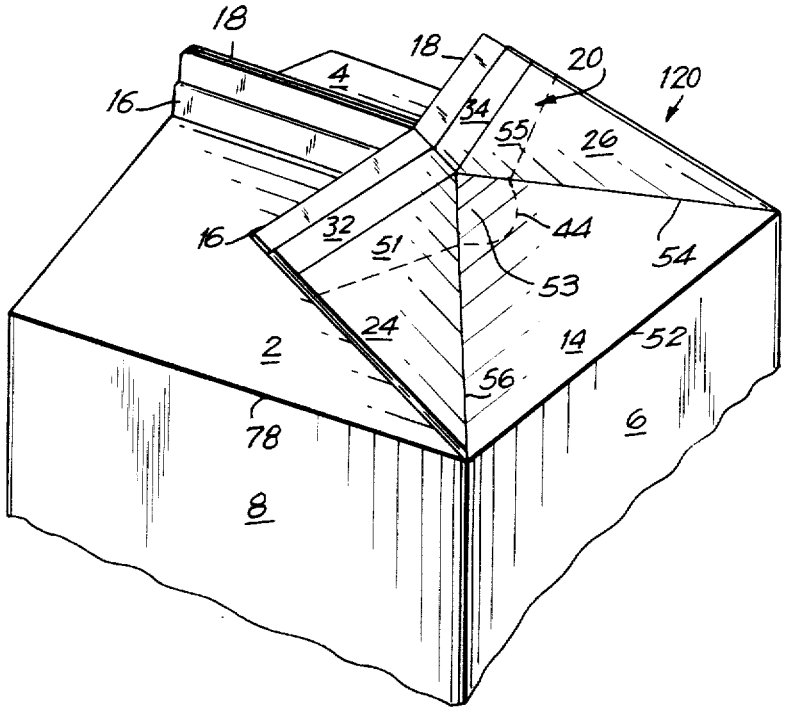
FIG. 3 shows the gable top of an extended shelf life container with the fold-back panels folded back exposing the continuous non-linear perforated line extending across the two fold-back panels and the triangular fold-in panel.

In referring to FIGS. 1, 3 and 4, the opening of the gable top to extend the spout defined by the continuous non-linear perforated line 20 will be described.

When it is desired to open the gable top, fold-back panels 24 and 26 are folded back toward the back panel 10. In folding back fold-back panels 24 and 26, portions roof panels 2 and 4 adjacent to the respective fold-back panels are also bent rearward about fold lines 84 and 76, respectively. In folding back fold-back panels 24 and 26, the sealed laminar rib comprised of side rib panels 16 and 18 and end rib panels 32, 34, 36 and 38 is forced open, as shown in FIG. 3, to a point where end rib panels 32 and 34 are opened and exposed. Once in this position with the fold-back panels 24 and 26 folded back to a point where the outside surfaces of the fold-back panels for a reflux angle, downward pressure is applied to the tab 53 above preferred line segment 44 in the triangular fold-in panel 14. This pressure causes severence along the perforated line in the paperboard support structure through all lamination thicknesses. Tab 53 is pressed downward to a point which insures that severance is accomplished along as much of the line segment 44 as possible. Once the severance has been initiated along line segemnt 44, the fold-back panels 24 and 26 are moved forward such that the sides integral with roof panels 2 and 4, respectively, remain at a distance from a vertical plane passing through the laminar rib equal to or less than the distance such sides are from the vertical planes when a reflex angle was formed between fold-back panels 24 and 26. Maintaining this distance or less in the forward movement will cause the pour spout to extend and further cause progressive severance of the laminate structure along segments 42 and 46 of the continuous perforated line.

Figure 4:
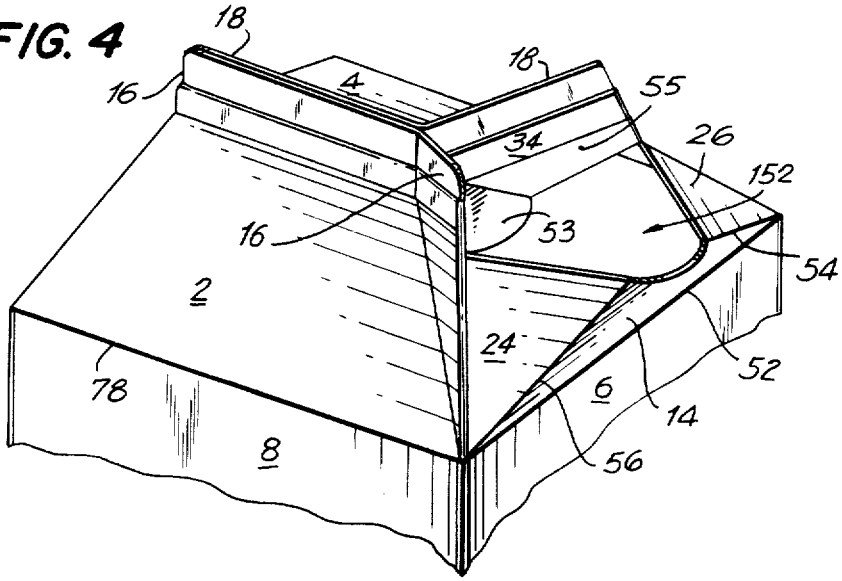
FIG. 4 shows the gable top of an extended shelf life packaging container with the pouring spout extended.

Referring to FIG. 4, once the pour spout is extended, pouring spout opening 152 is formed. When the pouring spout is extended, section 55 of fold-back panel 26, which is above fold line segment 46, will fold back against roof panel 4; likewise, section 51 of fold-back panel 24 will fold under against roof panel 2 when the pour spout is extended. During the entire opening operation section 53 of triangular fold-in panel 44 above segment 44 remains relatively stationary, except when being depressed.

The description of the continuous perforated line in the underlying paperboard support member can be of other non-linear shapes. Similarly, it can also be of a linear shape so long as the method for opening can be accomplished in the same manner as described herein.

The terms and expressions which are employed here are used as terms of description and not of imitation. And there is no intention, in the use of such terms and expressions, of excluding the equivalence of the feature shown, and described, or portions thereof, it being recognized that various modifications are possible in the scope of the invention as claimed.

I claim:

1. An improved pouring spout opening configuration for a gable top of an extended shelf life packaging container constructed of a laminate structure comprising:

a gable top having first and second roof panels inclined toward each other, first and second triangular fold-in panels infolded between said first and second roof panels from opposite ends of said gable top, first, second, third and fourth triangular fold-back panels whereby said first and second fold-back panels being integral with said first triangular fold-in panel along fold lines and being substantially in contact with said roof panels and said third and fourth fold-back panels being integral with said second triangular fold-in panel along fold lines and being substantially in contact with said roof panels, said first and fourth fold-back panels being folded against an underside of said first roof panel and said second and third *fold-back panels* being folded against the underside of said second roof panel, first and second side rib panels integral with and surmounting said first and second [side] roof panels, respectively, first, second, third and fourth end rib panels whereby said first and second end rib panels being integral with and surmounting said first and second fold-back panels, respectively, and said third and fourth end rib panels being integral with and surmounting said third and fourth fold-back panels respectively, said first and second end rib panels being folded to lie against each other and said first and second side rib panels and said third and fourth end rib panels being folded to lie against each other and said first and second side rib panels, said end rib panels having a height less than a height of said side rib panels, said rib panels defining a central laminar top rib portion divided longitudinally by a fixed portion and a movable portion, an extendable pouring spout housed in a collapsed condition within said container and defined in part by said first triangular fold-in panel, said first and second fold-back panels, said first and second end rib panels, adjacent portions of said roof panels and said side rib panels, said rib panels being adapted to be sealed by application of heat and pressure to form a liquid-tight seal thereto to bond together contacting thermoplastic surfaces, with said extendable pouring spout having a predetermined shape defined by a continuous perforated line in an underlying paperboard support layer of said laminated structure wherein said continuous perforated line in said paperboard support layer of said laminated structure extends from said fold line between said first fold-back panel and said first roof panel across said first fold-back panel to the fold line between said first fold back panel and said first triangular fold-in panel across said first triangular fold-in panel to the fold line between said first triangular fold-in panel and said second fold-back panel and across the second fold-back panel to the fold line between said second fold-back panel and said second roof panel *whereby said continuous perforated line has a first segment being a downwardly sloping straight portion traversing said first fold-back panel from the fold line between said first roof panel and said first fold-back panel to the fold line between said first triangular fold-in panel and said first fold-back panel, and forming an angle less than 90° with the side of said first fold-back panel integral with said first roof panel, with said continuous perforated line beginning at a position along the fold line between said first roof panel and said first fold-back panel spaced away from fold lines between other panels of said container intersecting with it, a second segment being a downwardly disposed circular portion traversing said first triangular fold-in panel from the fold line between said first fold-back panel and said first triangular fold-in panel to the fold line between said second fold-back panel and said first triangular fold-in panel, and a third segment being an upwardly sloping straight portion traversing said second fold-back panel from the fold line between said first triangular fold-in panel and said second fold-back panel to the fold line between said second fold-back panel and said second roof panel, and forming an angle less than 90° with the side of said second fold back panel integral with said second roof panel, with said continuous perforated line terminating at a position along the fold line between said second fold-back panel and said second roof panel spaced away from fold lines between other panels of said container intersecting with it.*

[2. The improved configuration as recited in claim 1, wherein said continuous perforated line in said paperboard support layer having a first shape in said first fold-back panel, a second shape in said first triangular fold-in panel, and a third shape in said second fold-back panel.]

[3. The improved configuration as recited in claim 2, wherein said continuous perforated line in said paperboard support layer having a first second being a downwardly sloping straight portion traversing said first fold-back panel from the fold line between said first roof panel and said first fold-back panel to the fold line between said first triangular fold-in panel and said first fold-back panel and forming an angle less than 90° with a side of said first fold-back panel integral with said first roof panel, a second segment being a downwardly disposed circular portion traversing said first triangular fold-in panel from said fold line between said first fold-back panel and said first triangular fold-in panel to the fold line between said second fold back panel and said first triangular fold-in panel, and a third segment being an upwardly sloping straight portion traversing said second fold-back panel from said fold line between said first triangular fold-in panel and said second fold-back panel to said fold line between said second roof panel and said second fold-back panel and forming an angle less than 90° with a side of said second fold back panel integral with said second roof panel.]

4. A method of opening a gable top of extended shelf life container constructed of a laminated structure comprising folding open a movable portion of a sealed laminar top rib of a gable top having first and second roof panels inclined toward each other, first and second triangular fold-in panels in-folded between said first and second roof panels from opposite ends of said gable top, first, second, third and fourth triangular fold-back panels whereby said first and second fold-back panels being integral with said first triangular fold-in panel along fold lines and being substantially in contact with said roof panels and said third and fourth fold-back panels being integral with said second triangular fold-in panel along fold lines and being substantially in contact with said roof panels, said first and fourth fold-back panels being folded against an underside of said first roof panel and said second and third *fold-back panels* being folded against the underside of said second roof panel, first and second side rib panels integral with and surmounting said first and second [side] roof panels, respectively, first, second, third and fourth end rib panels whereby said first and second end rib panels being integral with and surmounting said first and second fold-back panels, respectively, and said third and fourth end rib panels being integral with and surmounting said third and fourth fold-back panels, respectively, said first and second end rib panels being folded to lie against each other and said first and second side rib panels and said third and fourth end rib panels being folded to lie against each other and said first and second side rib panels, said end rib panels having a height less than a height of said side rib panels, said rib panels defining a central laminar top rib portion divided longitudinally by a fixed portion and a movable portion, an extendable pouring spout housed in a collapsed condition within said container and defined in part by said first triangular fold-in panel, said first and second fold-back panels, said first and second end rib panels, adjacent portions of said roof panels and said side rib panels, said rib panels being adapted to be sealed by application of heat and pressure to form a liquid-tight seal thereto to bond together contacting thermoplastic surfaces, with said extendable pouring spout having a predetermined shape defined by a continuous perforated line in an underlying paperboard support layer of said laminated structure extending from said fold line between said first fold-back panel and said first roof panel across said first fold-back panel to the fold line between said first fold back panel and said first triangular fold-in panel across said first triangular fold-in panel to the fold line between said first triangular fold-in panel and said second fold back panel, and across said second fold-back panel to the fold line between said second fold-back panel and said second roof panel *whereby said continuous perforated line has a first segment being a downwardly sloping straight portion traversing said first fold-back panel from the fold line between said first roof panel and said first fold-back panel to the fold line between said first triangular fold-in panel and said first fold-back panel, and forming an angle less than 90° with the side of said first fold-back panel integral with said first roof panel, with said continuous perforated line beginning at a position along the fold line between said first roof panel and said first fold-back panel spaced away from fold lines between other panels of said container intersecting with it, a second segment being a downwardly disposed circular portion traversing said first triangular fold-panel from the fold line between said first fold-back panel and said first triangular fold-in panel to the fold line between said second fold-back panel and said first triangular fold-in panel, and a third segment being an upwardly sloping straight portion traversing said second fold-back panel from the fold line between said first triangular fold-in panel and said second fold-back panel to the fold line between said second fold-back panel and said second roof panel, and forming an angle less than 90° with the side of said second fold back panel integral with said second roof panel, with said continuous perforated line terminating at a position along the fold line between said second fold-back panel and said second roof panel spaced away from fold lines between other panels of said container intersecting with it;* pressing inwardly toward an interior of said container a portion of said first triangular fold-in panel immediately below a point of convergence of said fold lines between said first triangular fold-in panel and said first and second fold-back panels, respectively, and above the portion of the continuous perforated line across said first triangular fold-in panel;

severing by pressing said laminated structure through all lamination thicknesses along said continuous [non-linear perforated line a portion of a length of said continuous] perforated line extending across said first triangular fold-in panel, folding further open said movable portion of said gable top much that a reflex angle is formed by outside surfaces of said fold-back panels;

severing progressively said laminated structure through all lamination thicknesses along remaining unsevered portions of said continuous perforated line and extending the pouring spout by moving said first and second fold back panels forward from the position whereby [a reflex angle is formed between said outside surfaces] *the sides* of said first and second fold-back panels [with respective sides of said fold back panels] integral with said first and second roof panels [being such that said sides] remain at a same distance or a lesser distance from a vertical plane passing through said laminar top in the forward movement of said first and second fold back panels.

*5. An improved pouring spout opening configuration for a gable top of an extended shelf life packaging container constructed of a laminate structure comprising:*

*a gable top having first and second roof panels inclined toward each other, first and second triangular fold-panels infolded between the first and second roof panels from opposite ends of the gable top, first, second, third and fourth triangular foldback panels whereby the first and second fold-back panels being integral with the first triangular fold-in panel along fold lines and being substantially in contact with the roof panels and the third and fourth fold-back panels being integral with the second triangular fold-in panel along fold lines and being substantially in contact with the roof panels, the first and fourth fold-back panels being folded against an underside of the first roof panel and the second and third fold-back panels being folded against the underside of the second roof panel, first and second side rib panels integral with and surmounting the first and second roof panels, respectively, first, second, third and fourth end rib panels whereby the first and second end rib panels being integral with and surmounting the first and second fold-back panels, respectively, and the third and fourth end rib panels being integral with and surmounting the third and fourth fold-back panels, respectively, the first and second end rib panels being folded to lie against each other and the first and second side rib panels and the third and fourth end rib panels being folded to lie against each other and the first and second side rib panels, the end rib panels having a height less than a height of the side rib panels, the rib panels defining a central laminar rib portion divided longitudinally by a fixed portion and a movable portion, an extendable pouring spout housed in a collapsed condition within the container and defined in part by the first triangular fold-panel, the first and second fold-back panels, the first and second end rib panels, adjacent portions of the roof panels and the side rib panels, the rib panels being adapted to be sealed by application of heat and pressure to form a liquid-tight seal thereto to bond together contacting thermoplastic surfaces, with the extendable pouring spout having a predetermined shape defined by a*

*continuous perforated line in an underlying paperboard support layer of the laminated structure wherein the continuous perforated line in the paperboard support layer of the laminated structure extends from the fold line between the first fold-back panel and the first roof panel across the first fold-back panel to the fold line between the first foldback panel and the first triangular fold-in panel, across the first triangular fold-in panel to the fold line between the first triangular fold-in panel and the second fold-back panel, and across the second fold-back panel to the fold line between the second fold-back panel and the second roof panel whereby the continuous perforated line has a first segment that is a downwardly sloping, non-linear portion traversing the first fold-back panel from the fold line between the first roof panel and the first fold-back panel to the fold line between the first triangular fold-in panel and the first fold-back panel, with the continuous perforated line beginning at a position along the fold line between the first roof panel and the first fold-back panel spaced away from where fold lines between other panels intersect with it, a second segment that is a downwardly disposed circular portion traversing the first triangular fold-in panel from the fold line between the first fold-back panel and the first triangular fold-in panel to the fold line between the second fold-back panel and the first triangular fold-in panel, and a third segment that is an upwardly sloping, non-linear portion traversing the second fold-back panel from the fold line between the first triangular fold-in panel and the second fold-back panel to the fold line between the second fold-back panel and the second roof panel with the continuous perforated line terminating at a position along the fold line between the second fold-back panel and the second roof panel spaced away from where fold lines between other panels intersect with it.*

*6. A method of opening a gable top of extended shelf life container constructed of a laminated structure, comprising the steps of:*

*folding open a movable portion of a sealed laminar top rib of a gable top having first and second roof panels inclined toward each other, first and second triangular fold-in panels in-folded between the first and second roof panels from opposite ends of the gable top, first, second, third and fourth triangular fold-back panels whereby the first and second fold-back panels being integral with the first triangular fold-in panel along fold lines and being substantially in contact with the roof panels and the third and fourth fold-back panels being integral with the second triangular fold-in panel along fold lines and being substantially in contact with the roof panels, the first and fourth fold-back panels being folded against an underside of the first roof panel and the second and third fold-back panels being folded against the underside of the second roof panel, first and second side rib panels integral with and surmounting the first and second panels, respectively, first, second, third and fourth end rib panels whereby the first and second end rib panels being integral with and surmounting the first and second fold-back panels, respectively, and the third and fourth end rib panels being integral with and surmounting the third and fourth fold-back panels, respectively, the first and second end rib panels being folded to lie against each other and the first and second side rib panels and the third and fourth end rib panels being folded to lie against each other and the first and second side rib panels, the end rib panels having a height less than a height of the side rib panels, the rib panels defining a central laminar top rib portion divided longitudinally by a fixed portion and a movable portion, an extendable pouring spout housed in a collapsed condition within the container and defined in part by the first triangular fold-in panel, the first and second fold-back panels, the first and second end rib panels, adjacent portions of the roof panels and the side rib panels, the rib panels being adapted to be sealed by application of heat and pressure to form a liquid-tight seal thereto to bond together contacting thermoplastic surfaces, with the extendable pouring spout having a predetermined shape defined by a continuous perforated line in an underlying paperboard support layer of the laminated structure extending from the fold line between the first fold-back panel and the first roof panel across the first fold-back panel to the fold line between the first fold-back panel and the first triangular fold-in panel, across the first triangular fold-in panel to the fold line between the first triangular fold-in panel and the second fold-back panel, and across the second fold-back panel to the fold line between the second fold-back panel and the second roof panel whereby the continuous perforated line has a first segment that is a downwardly sloping, non-linear portion traversing the first foldback panel from the fold line between the first roof panel and the first fold-back panel to the fold line between the first triangular fold-in panel and the first fold-back panel, with the continuous perforated line beginning at a position along the fold line between the first roof panel and the first fold-back panel spaced away from where fold lines between other panels intersect with it, a second segment that is a downwardly disposed circular portion traversing the first triangular fold-in panel from the fold line between the first fold-back panel and the first triangular fold-in panel to the fold line between the second fold-back panel and the first triangular fold-in panel, and a third segment that is an upwardly sloping, non-linear portion traversing the second fold-back panel from the fold line between the first triangular fold-in panel and the second fold-back panel to the fold line between the second fold-back panel and the second roof panel, with the continuous perforated line terminating at a position along the fold line between the second fold-back panel and the second roof panel spaced away from where fold lines between other panels intersect with it;*

*pressing inwardly toward an interior of the container a portion of the first triangular fold-in panel immediately below a point of convergence of the fold lines between the first triangular fold-in panel and the first and second fold-back panels, respectively, and above the portion of the continuous perforated line across the first triangular fold-in panel;*

*severing by pressing the laminated structure through all lamination thicknesses along the continuous perforated line extending across the first triangular fold-in panel;*

*folding further open the movable portion of the gable top such that a reflex angle is formed by outside surfaces of the fold-back panels; and*

*severing progressively the laminated structure through all lamination thicknesses along remaining unsevered portions of the continuous perforated line and extending the pouring spout by moving the first and second fold-back panels forward from the position whereby the sides of the first and second fold-back panels integral with the first and second roof panels remain at a same distance or lesser distance from a vertical plane passing through the laminar top rib in the forward movement of the first and second fold-back panels.*

* * * * *